United States Patent
Dudebout et al.

(10) Patent No.: US 10,816,211 B2
(45) Date of Patent: Oct. 27, 2020

(54) AXIALLY STAGED RICH QUENCH LEAN COMBUSTION SYSTEM

(71) Applicant: HONEYWELL INTERNATIONAL INC., Morris Plains, NJ (US)

(72) Inventors: Rodolphe Dudebout, Phoenix, AZ (US); Sunil James, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 366 days.

(21) Appl. No.: 15/686,533

(22) Filed: Aug. 25, 2017

(65) Prior Publication Data
US 2019/0063754 A1     Feb. 28, 2019

(51) Int. Cl.
 *F23R 3/34* (2006.01)
 *F02C 7/228* (2006.01)
 *F23R 3/00* (2006.01)
 *F23R 3/06* (2006.01)

(52) U.S. Cl.
CPC .............. *F23R 3/343* (2013.01); *F02C 7/228* (2013.01); *F23R 3/002* (2013.01); *F23R 3/06* (2013.01); *F23R 3/346* (2013.01)

(58) Field of Classification Search
CPC ...... F23R 3/02; F23R 3/06; F23R 3/34; F23R 3/343; F23R 3/346; F23R 3/54; F23R 2900/00014; F23R 2900/00015; F02C 7/228; F02C 3/145
See application file for complete search history.

(56) References Cited

U.S. PATENT DOCUMENTS

| 6,286,298 | B1* | 9/2001 | Burrus ............. F23R 3/28 60/732 |
| 7,302,801 | B2 | 12/2007 | Chen |
| 8,127,554 | B2 | 3/2012 | Zupanc et al. |

(Continued)

FOREIGN PATENT DOCUMENTS

| EP | 1055879 A1 | 11/2000 |
| EP | 2479498 B1 | 10/2016 |

(Continued)

OTHER PUBLICATIONS

Extended EP Search Report for Application No. 18190604.1 dated Dec. 5, 2018.

*Primary Examiner* — William H Rodriguez
*Assistant Examiner* — David P. Olynick
(74) *Attorney, Agent, or Firm* — Lorenz & Kopf, LLP

(57) ABSTRACT

A combustion system and a method of combustion for a gas turbine engine includes a combustor liner defining a combustion chamber. A plurality of fuel nozzle sets extend into, and supply fuel flow to, the combustion chamber. A pilot fuel nozzle injects a first fuel spray in a tangential direction relative to the combustion liner and toward the upstream end of the combustion chamber. A main fuel nozzle injects a second fuel spray toward the exit end of the combustion chamber. At ignition conditions, a majority of the fuel flow is injected through the pilot fuel nozzles, and at high power conditions a majority of the fuel flow is injected through the main fuel nozzles. At high power conditions, a fuel rich mixture is supplied to the combustion chamber, and a row of quench jets are configured to supply air to the combustion chamber, providing rich-quench-lean combustion.

20 Claims, 7 Drawing Sheets

(56) References Cited

U.S. PATENT DOCUMENTS

| | | | | |
|---|---|---|---|---|
| 10,139,111 B2* | 11/2018 | Laster | ............... | F23R 3/346 |
| 2005/0229604 A1* | 10/2005 | Chen | ............... | F23R 3/34 |
| | | | | 60/776 |
| 2011/0079013 A1* | 4/2011 | Mehring | ............... | F02C 3/145 |
| | | | | 60/740 |
| 2012/0023964 A1 | 2/2012 | Mehring | | |
| 2013/0199200 A1* | 8/2013 | Hoke | ............... | F02C 7/22 |
| | | | | 60/776 |
| 2013/0305726 A1 | 11/2013 | Carrere et al. | | |
| 2016/0040599 A1* | 2/2016 | Chen | ............... | F23R 3/06 |
| | | | | 60/748 |
| 2016/0138808 A1* | 5/2016 | Huebner | ............... | F23R 3/34 |
| | | | | 60/734 |
| 2019/0170357 A1* | 6/2019 | Taliercio | ............... | F23R 3/283 |

FOREIGN PATENT DOCUMENTS

| | | | |
|---|---|---|---|
| FR | 3001525 | A1 | 8/2014 |
| WO | 2015009488 | A1 | 1/2015 |

\* cited by examiner

AXIALLY STAGED RICH QUENCH LEAN COMBUSTION SYSTEM

TECHNICAL FIELD

The present invention generally relates to gas turbine engines, and more particularly relates to rich burn, quick quench, lean burn axially staged combustion systems that provide reduced emissions.

BACKGROUND

A gas turbine engine may be used to power aircraft or various other types of vehicles or systems. Such engines typically include a compressor that receives and compresses incoming gas such as air; a combustor in which the compressed gas is mixed with fuel and burned to produce high-pressure, high-velocity exhaust gas; and one or more turbines that extract energy from the exhaust gas exiting the combustor. Combustion typically takes place in one combustion zone where fuel is burned at all power conditions There is an increasing desire to reduce combustion by-product emissions, particularly oxides of nitrogen (NOx), carbon monoxide (CO), and particulates, which may form during the combustion process. Combustion is typically achieved in a combustion chamber over a range of operating conditions. As a result, combustors operate under a variety of pressures, temperatures, and mass flows. These factors change with power requirements and environmental conditions. For example, engine idle conditions are considerably different than full power conditions. Controlling the various forms of combustion by-products over the range of operating conditions is challenging.

Accordingly, it is desirable to provide improved combustion systems in gas turbine engines with effective combustion for the control of NOx and other emissions under varying conditions. It is also desirable to provide effective control in a cost-effective manner. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In accordance with an exemplary embodiment, a combustion system for a gas turbine engine is provided. The combustion system includes a combustor liner defining a combustion chamber. A plurality of fuel nozzles extend into, and supply fuel flow to, the combustion chamber. A pilot fuel nozzle injects a first fuel spray in a tangential direction relative to the combustor liner and toward the upstream end of the combustion chamber. A main fuel nozzle injects a second fuel spray toward the exit end of the combustion chamber. At ignition conditions, a majority of the fuel flow is injected through the pilot fuel nozzles, and at high power conditions a majority of the fuel flow is injected through the main fuel nozzles. At high power conditions, a fuel rich mixture is supplied to the combustion chamber, and a row of quench jets are configured to supply air to the combustion chamber, providing rich-quench-lean combustion.

In accordance with another exemplary embodiment, a method of combustion in a gas turbine engine includes defining a combustion chamber by a combustor liner that extends from an upstream end to an exit end. Air flows through the combustor liner generally from the upstream end to the exit end. A fuel flow is supplied to the combustion chamber through a pilot fuel nozzle, which injects a first fuel spray in a tangential direction relative to the combustion liner and toward the upstream end of the combustion chamber. The fuel flow is also provided through a main fuel nozzle, which injects a second fuel spray that is directed toward the exit end of the combustion chamber. A shroud extends into the combustion chamber and houses the pilot fuel nozzle and the main fuel nozzle. The first fuel spray supplies substantially all of the fuel flow at idle operating conditions, and at full power conditions the second fuel spray accounts for more than fifty percent of the fuel flow.

In accordance with another exemplary embodiment, a combustion system for a gas turbine engine includes a combustor liner defining a combustion chamber extending from an upstream end to an exit end. Air flows into and through the combustor liner, generally from the upstream end to the exit end. An axial direction is defined from the upstream end to the exit end, and the combustor liner encircles the combustion chamber. A fuel circuit includes a plurality of fuel nozzle sets extending into the combustion chamber, and supplies a fuel flow to the combustion chamber. A pilot fuel nozzle in each fuel nozzle set injects a first fuel spray in a tangential direction relative to the combustion liner and toward the upstream end of the combustion chamber. A main fuel nozzle in each fuel nozzle set injects a second fuel spray toward the exit end of the combustion chamber. At ignition conditions of the gas turbine engine the pilot fuel nozzles supply more than fifty percent of the fuel flow and at high power conditions more than fifty percent of the fuel flow is injected through the main fuel nozzles. The main fuel nozzles supply a fuel rich mixture to the combustion chamber, and a row of quench jets supply air to the combustion chamber at a location downstream from the main fuel nozzles in the axial direction, providing rich-quench-lean combustion in the combustion chamber.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, the exemplary embodiments discussed herein provide a combustion system and methods of combustion for a gas turbine engine that achieve combustion for emission control over a range of operating conditions. The combustion system generally includes a combustor with a pilot zone that consumes fuel at low power conditions resulting in effective emission control of carbon monoxide (CO) and unburned hydrocarbons (UHC's), and a main zone where effective emission control of Oxides of Nitrogen (NOx) and particulates is achieved at high power conditions. The pilot zone of the combustor consumes fuel at low power conditions with high combustion efficiency provided through the use of a unique pilot injector arrangement. The main zone consumes fuel that is primarily supplied through main injectors, using rich burn, quick quench, lean burn (rich-quench-lean or RQL), combustion. The pilot zone provides a long residence time for consuming the fuel through complete combustion at low power conditions. The main zone provides a short combustion time to consume the fuel under conditions that minimize unwanted emissions, as further described below.

Figure 1:
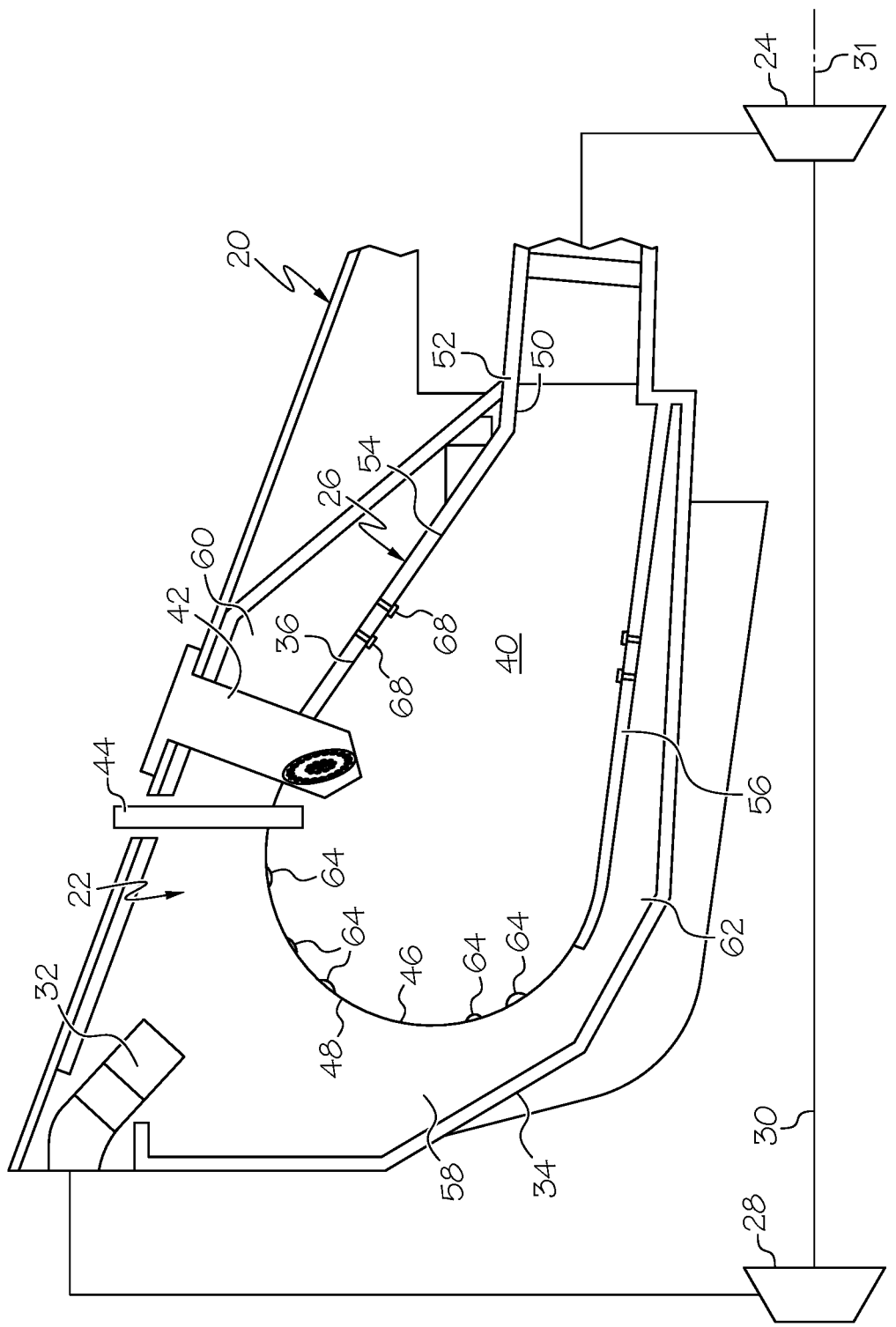
FIG. 1 is a schematic cross-sectional view of a combustion system of a gas turbine engine in accordance with an exemplary embodiment.

FIG. 1 is a cross-sectional view of a combustor area of an engine 20 showing a combustion system 22 in accordance with an exemplary embodiment. For purposes of the current example, the engine 20 is a turbofan type of gas turbine engine, with a turbine 24 that achieves mechanical energy from combustion of air and fuel in a combustor 26. The combustor 26 mixes admitted air with fuel and ignites the resulting mixture to generate high energy combustion gases that are then directed into the turbine 24. The mechanical energy from the turbine 24 is used to drive a compressor 28, which may be embodied in the form of a ducted fan driven by the turbine 24 through a shaft 30. The shaft 30 defines an axis 31 around which the compressor 28 and the turbine 24 rotate. The compressor 28 pressurizes air for use in the combustor 26 and generally accelerates air through the engine 20, which may contribute to thrust. Air is delivered from the compressor 28 to the combustor 26 through an air discharge 32. Compressed air is discharged into the combustor's case 34. Combustion is contained within a liner 36 which is disposed in the case 34. The combustor 26 is an annular type, with the liner 36 and the case 34 encircling the shaft 30. Accordingly, the liner 36 defines a single annular shaped combustion chamber 40 that extends around the axis 31. An injector module 42 extends into the combustion chamber 40 for the introduction of air and fuel. Given the combustion chamber 40 is annular in shape extending around the shaft 30 as defined by the liner 36, it will be appreciated that a number of injector modules are disposed around its circumference. In a number of embodiments, a circumferential array of injector modules 42 is disposed around the combustion chamber 40. These injector modules 42 may be equally angularly spaced about the annular combustion chamber 40. In the current embodiment, the number of injector modules 42 is sixteen, although the number will vary with the application. In general, air from the compressor 28 is supplied into the case 34, and air and fuel are delivered into the combustion chamber 40 and ignited by the igniter 44. In addition to the air supplied to the combustion chamber 40 through the injector module 42, air passes from within the case 34 into the combustion chamber 40 through various openings in the liner 36 as further described below.

In the exemplary embodiment of FIG. 1, the liner 36 includes a dome 46 at its upstream end 48 located toward the compressor 28, and an exhaust opening 50 at its exit end 52 located toward the turbine 24. An axial direction 49 is defined between the upstream end 48 and the exit end 52, and is parallel to the axis 31. Between the dome 46 and the exhaust opening 50, the liner 36 includes a ring shaped outer liner wall 54 and a ring shaped inner liner wall 56, each of which encircles the axis 31. The outer liner wall 54 extends around the inner liner wall 56 to define the annular combustion chamber 40. Notable is that no fuel injector is disposed through the dome 46, but rather the injector module 42 extends through the outer liner wall 54 into the combustion chamber 40, at a downstream location from the dome 46. Compressed air enters the case 34, which defines an expanding diffuser 58 leading to the liner 36. The air flows between the case 34 and the liner 36 through an outer air plenum 60 and an inner air plenum 62. As will be appreciated, air enters the combustion chamber from the air plenums 60, 62 through the injector module 42, through effusion cooling holes 64 distributed in the dome 46, the outer wall 54 and the inner wall 56, and through quench jets 68 as further described below. In one example, the relative contributions of admitted air include a majority of the air entering through the injector modules 42, with the quench jets 68 providing the second largest inflow of air to the combustion chamber 40, followed by the effusion cooling holes 64.

Figure 2:
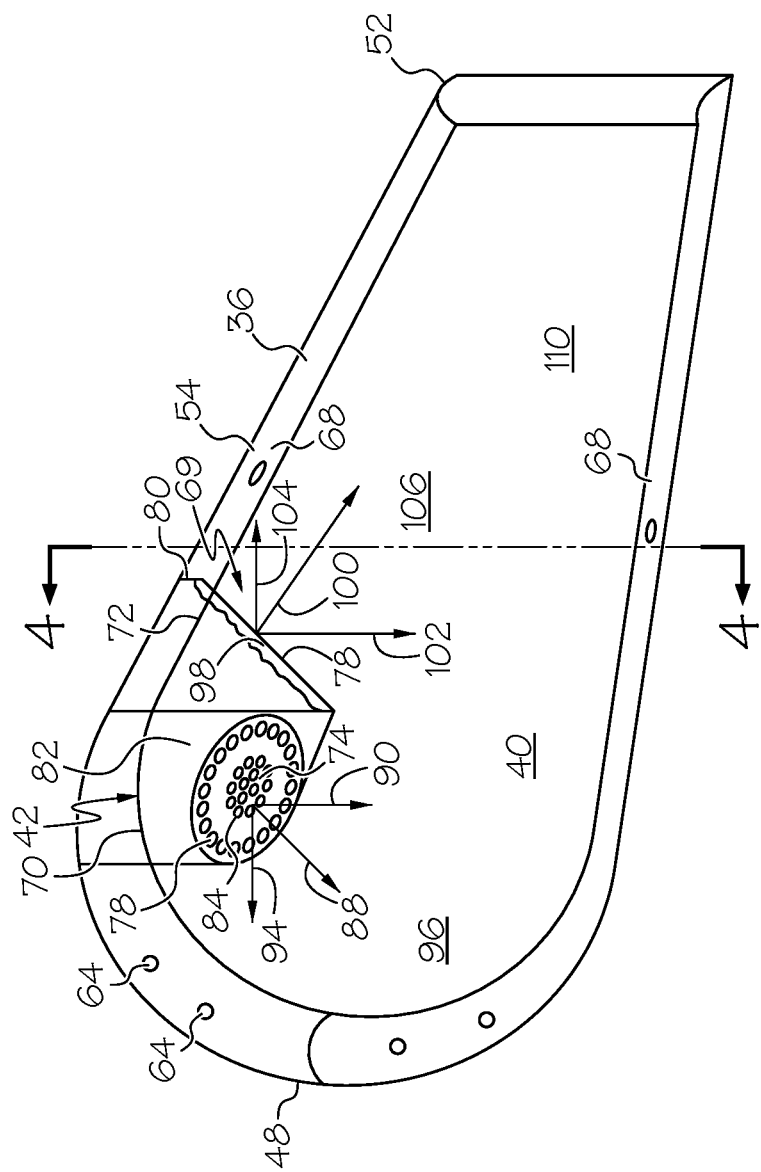
FIG. 2 is a schematic illustration of the combustion chamber area of the combustion system of FIG. 1, in accordance with an exemplary embodiment.
Figure 3:
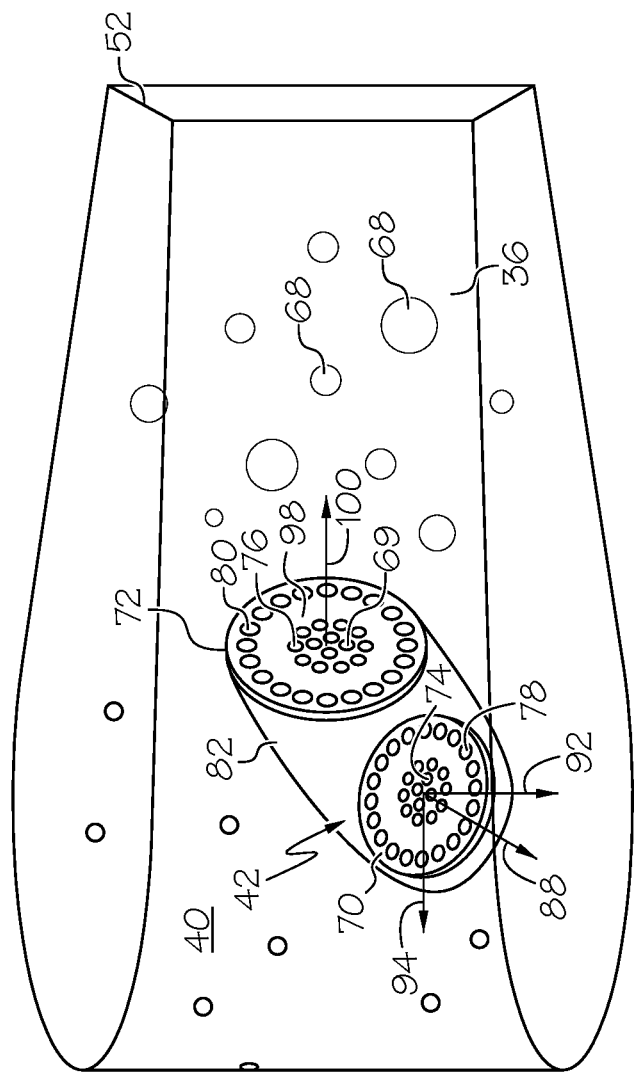
FIG. 3 is a schematic illustration of the combustion chamber area of the combustion system of FIG. 1, in accordance with an exemplary embodiment.

Referring to FIGS. 2 and 3, the injector module 42 includes a pilot injector 70 and a main injector 72. Each of the injectors 70, 72 includes a fuel nozzle set 69 with a pilot fuel nozzle 74 and a main fuel nozzle 76, and air jets 78, 80 respectively. Accordingly, fuel and air for combustion is introduced into the combustion chamber 40 from the pilot injector 70 and/or from the main injector 72. While all the fuel enters the combustion chamber from the injector module(s) 42, air is introduced through the injector module(s) 42, the effusion cooling holes 64 and the quench jets 68. In the exemplary embodiment, the pilot injector 70 and the main injector 72 are surrounded by a common shroud 82. The shroud 82 houses the fuel nozzles 74, 76 and provides protection from flames in the combustion chamber 40.

Figure 5:
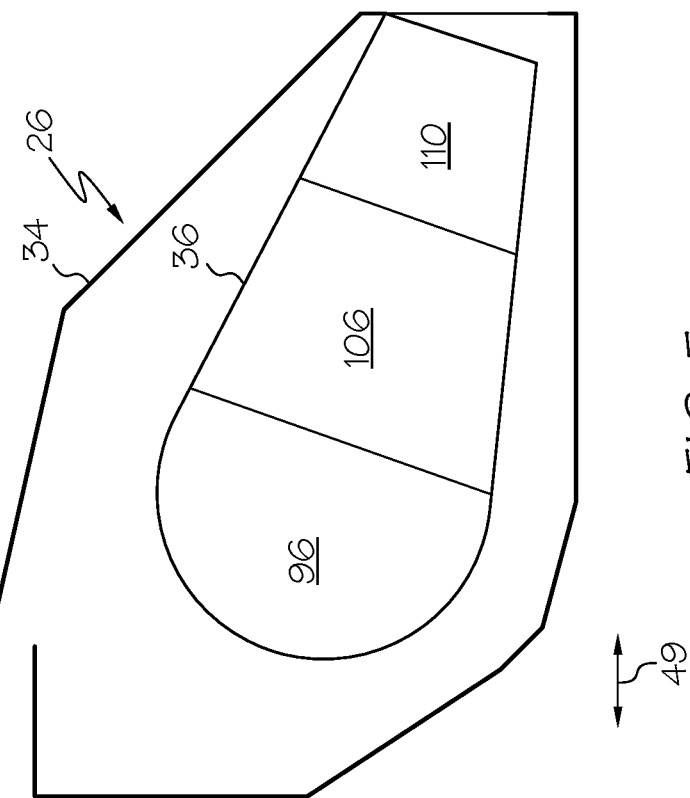
FIG. 5 is a schematic illustration of the combustion chamber area of the combustion system of FIG. 1, in accordance with an exemplary embodiment.
Figure 4:
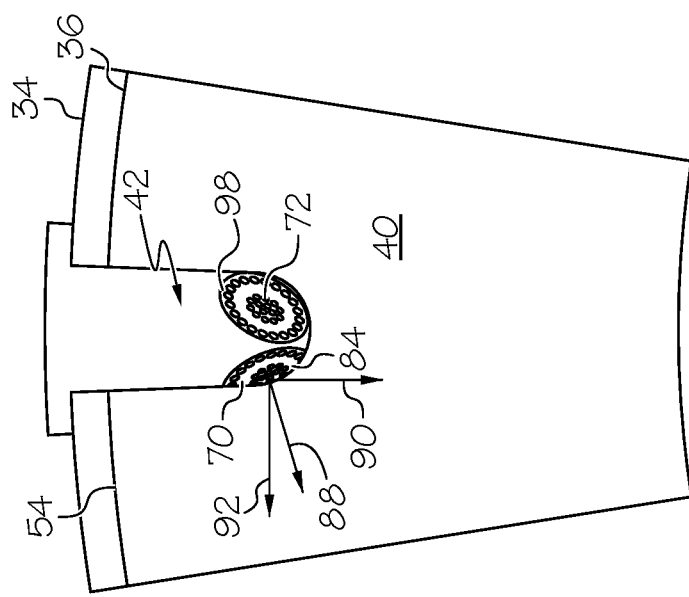
FIG. 4 is a schematic cross-sectional view of the combustion chamber area of FIG. 2 taken through line 4-4, in accordance with an exemplary embodiment.

In the exemplary embodiment, the pilot injector 70 includes a face 84 through which the pilot fuel nozzles 74 and the air jets 78 open into the combustion chamber 40. With additional reference to FIG. 4, which shows a sector of the annular combustion chamber 40 as viewed from the exit end 52, the injector module 42 is shown extending through the liner 36. The face 84 is oriented to face into the combustion chamber 40 directing the injected fuel and air in a direction 88 that has a radial direction component 90, a tangential direction component 92, and a forward direction component 94. The radial direction component 90 is directed from the face 84 toward the axis 31 (shown in FIG. 1). The forward direction component 94 is directed from the face 84 toward the upstream end 48 of the liner 36 in the axial direction 49. The tangential direction component 92 is directed from the face 84 tangentially, relative to the annular combustion chamber 40 and the curvature of the liner 36. Accordingly, the pilot injector 70 injects in a compound angular direction that is a combination of radial, tangential and axial direction components. With additional reference to FIG. 5, this orientation of the pilot injector face 84 injects air and fuel into a pilot zone 96 of the combustion chamber 40 from the position of the pilot injector 70 in the outer liner wall 54 at a position spaced away from the upstream end 48. In the current example, the pilot zone 96 has a relatively large volume, for example, 492 cubic inches. In low power conditions of the engine 20, substantially complete combustion of the fuel delivered through the pilot fuel nozzle 74 occurs in the pilot zone 96, aided by a longer residence time due to the large volume.

The main injector 72 includes a face 98 through which the main fuel nozzles 76 and the air jets 80 open into the combustion chamber 40. The face 98 is oriented to face into the combustion chamber 40 directing the injected fuel and air in a direction 100 that has a radial direction component 102 and a rearward direction component 104. The radial direction component 102 is directed from the face 98 toward the axis 31 (shown in FIG. 1). The rearward direction component 104 is directed from the face 98 toward the exit end 52 of the liner 36, in the axial direction 49. Accordingly, the main injector 72 injects in a compound angular direction that is a combination of radial and axial components. This orientation of the main injector face 98 injects air and fuel into a main zone 106 of the combustion chamber 40 from the position of the main injector 72 in the outer liner wall 54. In the current example, the main zone 106 has a relatively small volume, for example, 281 cubic inches. This size is smaller than the pilot zone 96 and the small size reduces the residence time for fuel introduced through the main injector 72. NOx emissions are determined in part, by residence times, and shorter residence times are preferred.

The combustion chamber has a third axially staged zone, referred to as quench zone 110. The quench zone 110 is so named due to a number of quench jets 68 that admit air from the outer air plenum 60 and/or the inner air plenum 62 into the combustion chamber 40 to rapidly dilute the fuel to air ratio present. In this example the quench zone 110 has a volume of 171 cubic inches. In comparison, the quench zone 110 is smaller than each of the pilot zone 96 and the main zone 106. The remainder of the fuel introduced through the main injectors 72 that isn't combusted in the main zone 106 is completely combusted in quench zone 110. The small volume helps reduce residence time for the combustion.

The location of combustion within the three zones of the combustion chamber 40 is determined by the supply of fuel between the pilot injectors 70 and the main injectors 72, by their orientation, and by air admission. At ignition of the engine 20, fuel is supplied through the pilot injectors 70 with no fuel through the main injectors 72. Combustion takes place in the pilot zone 96. Air is admitted directly into the pilot zone 96 through the air jets 78 of the pilot injectors 70, and also through the effusion cooling holes 64 in the dome 46, the outer liner wall 54 and the inner liner wall 56. Air flow in the combustion chamber 40 is generally directed from the upstream end 48 toward the exit end 52 for exit through the exhaust opening 50. The igniter 44 is located on the upstream side of the injector module 42, which is closer to the upstream end 48. The pilot injector 70 directs fuel with the forward direction component 94 to ensure ignition. The pilot injector 70 also directs fuel with the tangential direction component 92 to support complete combustion in the pilot zone 96. At low power conditions, such as at idle of the engine 20, as noted above, a long residence time in the combustion chamber 40 is provided to assist in achieving complete combustion. Fuel is supplied to the pilot zone 96 of the combustion chamber 40 through the pilot injectors 70. The pilot zone 96 is operated at near stoichiometric, with an equivalence ratio near 1.0, so that complete combustion is achieved. The equivalence ratio is the ratio of the actual fuel/air ratio to the stoichiometric fuel/air ratio. Accordingly, stoichiometric combustion has an equivalency ratio of 1.0. Stoichiometric combustion occurs when all the oxygen is consumed in the reaction, and there is no molecular oxygen in the exhaust products. The compound angular direction at which the pilot injector 70 injects air and fuel helps with mixing, residence time, and combustion. Accordingly, high combustion efficiency is provided with complete combustion that results in low carbon monoxide (CO) production, which is one of the goals in emission control. Little or no fuel is supplied through the main injectors 72 at low power conditions. In some embodiments, a minimal amount of fuel is supplied through the main injectors 72 at low power conditions to avoid coking.

In the exemplary embodiment, the combustor 26 is an annular RQL gas turbine engine combustor. In other embodiments, the combustor 26 may be another type of combustor. A "rich-burn" condition in the main zone 106 enhances the stability of the combustion reaction by producing and sustaining a high concentration of energetic hydrogen and hydrocarbon radical species. Rich burn means more fuel is introduced than a stoichiometric amount. Rich burn conditions minimize the production of NOx due to the relative low temperatures and low population of oxygen containing intermediate species. From the main zone 106 to the quench zone 110, the combustion regime shifts rapidly from rich to lean without dwelling at a high NOx production state. This is accomplished by moving from a rich burn state where more fuel is present than a stoichiometric amount to a lean burn state where less fuel is present than a stoichiometric amount. During operation at a high power state, such as during aircraft takeoff where the engine 20 operates at or near full power, a portion of the pressurized air from the compressor 28 enters the main zone 106 of the combustion chamber 106 through the injector module 42 and the effusion cooling holes 64. As described above, the pilot and main injectors 70, 72 are arranged to supply fuel in different compound angular directions, which in combination include the radial direction component 90, the tangential direction component 92, the forward direction component 94, the radial direction component 102 and the rearward direction component 104. The admitted air mixes with a quantity of fuel sufficient to achieve the rich burn condition in the main zone 106. Fuel is supplied through both the pilot injectors 70 and the main injectors 72. At high power conditions, the pilot zone 96 is operated fuel lean, such as at an equivalence ratio of 0.4. The main zone is operated fuel rich, such as at an equivalence ratio of 2.0. Operating the pilot zone 96 fuel lean results in low NOx production, while providing preheating for combustion in the main zone 106. Operating the main zone 106 under fuel rich conditions and with a low residence time due to the relatively small volume and air flow, also results in low NOx production. The rich stoichiometry of the fuel-air mixture in the main zone 106 produces a relatively cool, oxygen-deprived flame, which also reduces NOx formation.

Moving from the main zone 106 to the quench zone 110, combustion conditions transition from fuel rich to fuel lean rapidly. Air is admitted through the quench jets 68 to make the conversion. The combustion gases from the rich burn main zone 106, which include unburned fuel, enter the quench zone 110. Air is admitted from the inner and outer air plenums 60, 62 and into the quench zone 110 through the quench jets 68 in the outer and inner liner walls 54, 56, respectively. Flow through the quench jets 68 is referred to as quench air because it rapidly mixes with the combustion gases to move them from a stoichiometrically rich state to a stoichiometrically lean state. This supports further combustion and releases additional energy from the fuel. The combustion gases passing through the quench zone 110 are mixed rapidly to change from a fuel-rich state to a fuel-lean state. In one example, the quench jets 68 admit 38 percent of the compressor discharge air. Combined with the low volume of the quench zone 110, the admitted air rapidly creates the fuel lean conditions. In addition, the quench jets 68 are configured to produce radially penetrating air jets that project into the combustion chamber 40 for rapid mixing within the quench zone 110. Some of the air jets admitted through the quench jets 68 may radially penetrate the combustion chamber 40 more than 50% of its radial depth. Following quench, the combustion products are consumed under fuel-lean conditions, where the combustion process concludes. The exhaust gases move through the exhaust opening 50 and on the turbine 24.

Figure 6:
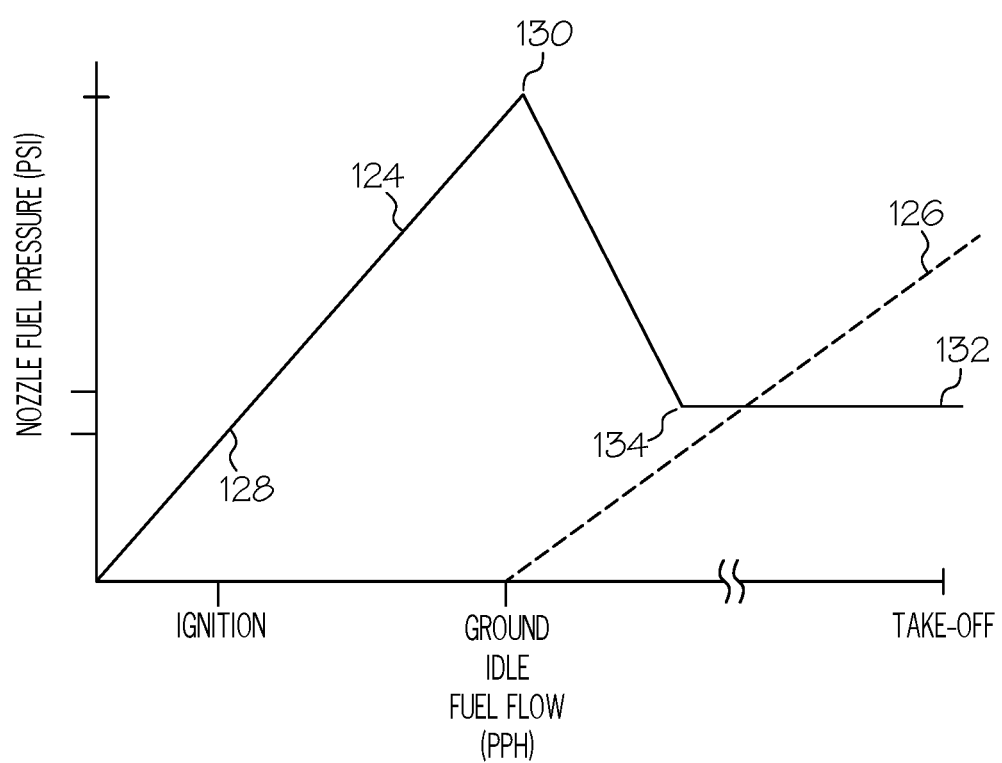
FIG. 6 is a graph of power versus fuel flow for the combustion system of FIG. 1.

FIG. 6 illustrates combustion in the combustion chamber 40 of the engine 20 at various operating conditions graphically. Fuel pressure is indicated along the vertical axis 120 in pounds per square inch, and fuel flow is indicated along the horizontal axis 122 in pounds per hour. Fuel flow is split between the pilot injectors 70 and the main injectors 72. For example, a flow divider valve (not shown) may sequence operation to divide flow between the two injector sets. Curve 124 represents the pilot injectors 70 and curve 126 represents the main injectors 72. At start of the engine 20, fuel flow is introduced through the pilot injectors 70 as indicate by curve 124. The igniters 44 will be turned on and light off occurs at point 128. The introduced fuel is lit by the igniters 44 causing ignition, and combustion occurs in the pilot zone 96. Speed of the engine 20 increases and fuel flow increases to a stable idle state at point 130. During this phase, more than fifty percent of the fuel flow is through the pilot injectors 70, and in the exemplary embodiment, the fuel flow is entirely through the pilot injectors 70. As noted above, in some embodiments, a small amount of trickle flow is delivered through the main injectors 72 during this phase to prevent coking. The igniters 44 are turned off at a threshold speed of the engine 20. Above the idle point 130, fuel flow is initiated and/or increased through the main injectors 72 as shown by the curve 126, while it is decreased through the pilot injectors 70 as shown by a downward slope of the curve 124. Combustion now occurs in the main zone 106, and in the quench zone 110. Fuel flow through the pilot injectors 70 is decreased to a minimum level 132 sufficient to keep the flame initiated from the pilot injectors 70 from blowing out. The minimum level 132 is maintained from point 134 onward. For example, at full power of the engine 20, more than fifty percent, and in the exemplary embodiment, approximately ninety percent of the fuel flow is through the main injectors 72. Also at full power less than fifty percent of the total fuel flow is through the pilot injectors 70, and in the exemplary embodiment, approximately ten percent is through the pilot injectors 70.

Figure 7:
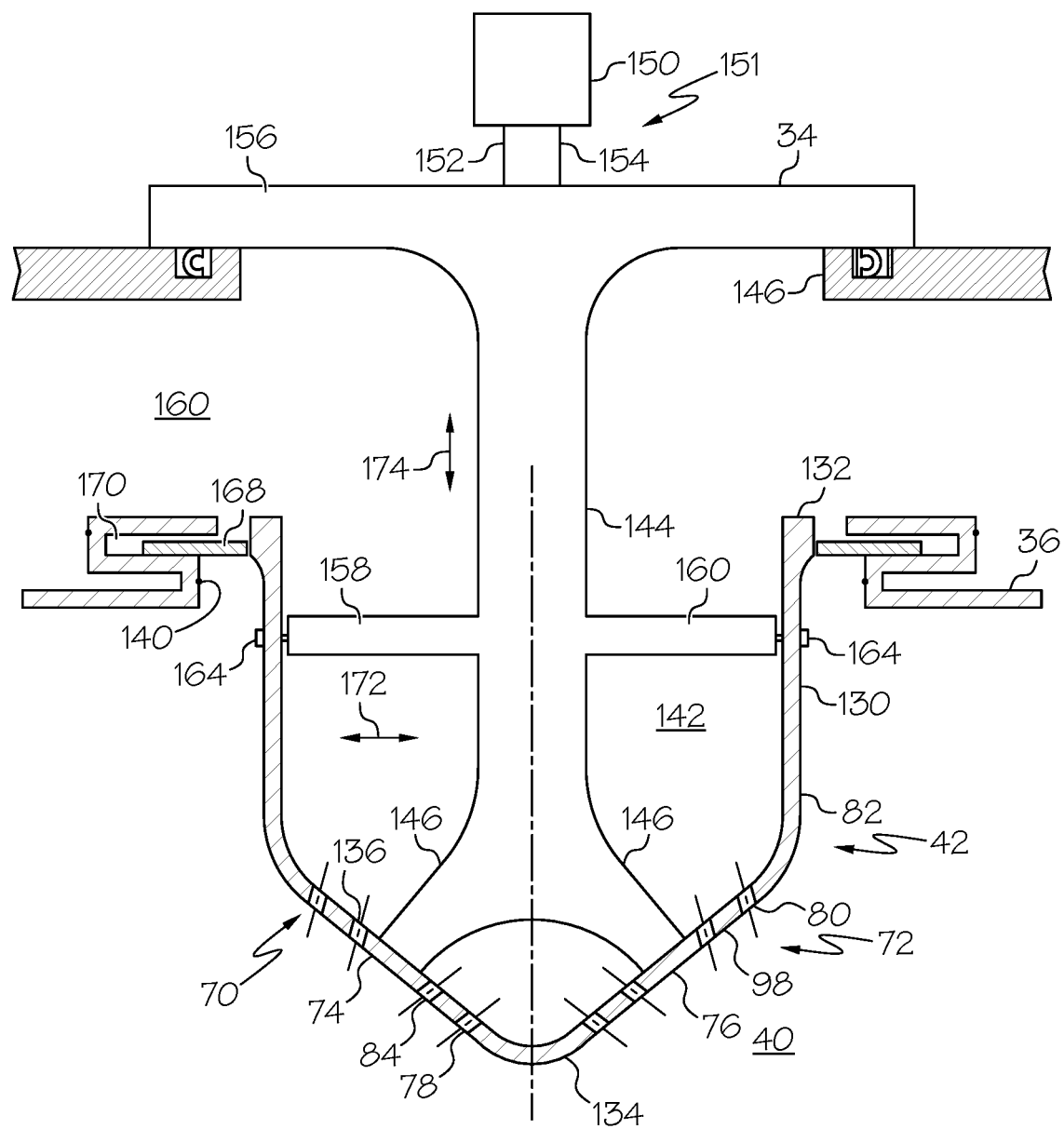
FIG. 7 is a schematic cross sectional illustration of a fuel injector system for the combustion system of FIG. 1, in accordance with an exemplary embodiment.

Referring to FIG. 7, an exemplary embodiment of the injector module 42 is illustrated. The injector module 42 is coupled to the case 34, extends through the liner 36, and is configured to inject fuel and air into the combustion chamber 40 through a pilot injector 70 and a main injector 72. The pilot and main injectors 70, 72 are disposed in a shroud 82 together. The shroud 82 is formed from a hollow cylindrical section 130 with an open end 132 and an end 134 that is closed by a domed section 136, which projects outwardly from the cylindrical section 130. The domed section 136 defines the face 84 of the pilot injector 70 and the face 98 of the main injector 72. Accordingly, the orientation of the faces 84, 98 is determined by the shape of the domed section 136. Orientation of the faces 84, 98 through formation of the dome 136 provides the compound angular directions of the fuel and air leaving the pilot injectors 70 and the main injectors 72. The open end 132 is movably secured in an opening 140 defined in the liner 36. The shroud 82 includes an open interior 142 that is open to the outer air plenum 60 through the open end 132. A fuel rail 144 extends through an opening 146 in the case 34 and into the shroud 82, connecting therewith at the domed section 136. The fuel rail 144 includes a pilot leg 146 feeding fuel to the pilot fuel nozzle 74 (shown in FIGS. 2-3), and a main leg 148 feeding fuel to the main fuel nozzle 76 (shown in FIGS. 2-3). The fuel nozzles 74, 76 are supplied with fuel from a supply system 150 through a fuel circuit 151 with separate supply lines 152, 154 for the pilot and main supply respectively, which extend through the fuel rail 144. The domed section 136 defines the air jets 78 through the face 84, which are distributed around the pilot leg 146. Similarly, the domed section 136 defines the air jets 80 through the face 98, which are distributed around the main leg 148. Air delivered from the compressor 28 to the outer air plenum 60, is delivered to the combustion chamber 40 through the open interior 142 and the air jets 78, 80. The fuel rail 144 is maintained in position relative to the case 34 by a mounting flange 156, which closes the opening 146. Mounting brackets 158, and 160 extend from the fuel rail 144 to the shroud 82 and are connected therewith by pins 164, 166. A seal ring 168 is trapped in a groove 170 formed around the opening 140 and engages the shroud 82 adjacent the open end 132. The seal ring 168 allows the shroud 82 to move relative to the liner 36 in a direction 172 that allows expansion and contraction as the circumference of the shroud 82 changes with heating and cooling at a rate different than the liner 36. The seal ring 168 also allows the shroud 82 to move in a direction 174 relative to the liner 36, allowing it to move toward and away from the case 34 at a rate different than the liner 36.

Figure 8:
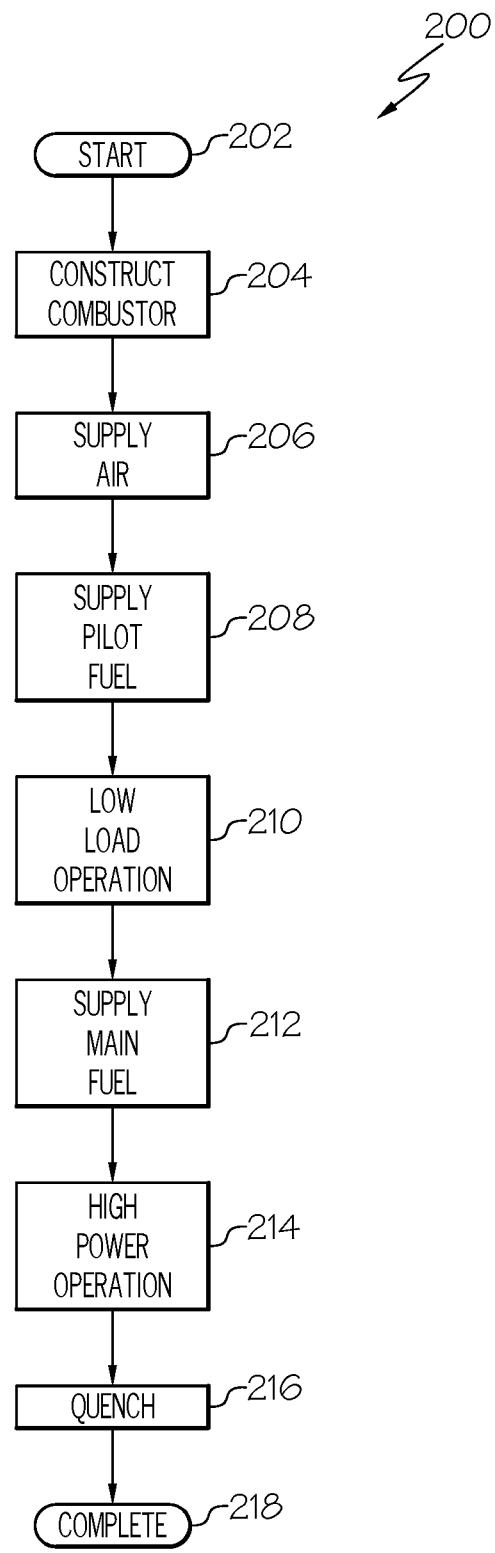
FIG. 8 is a flow chart of a process illustrating methods of combustion in a gas turbine engine, according to a number of embodiments.

With reference to FIG. 8, a process 200 of combustion in the gas turbine engine 20 is initiated at step 202, such as when a design and construction operation is started. At step 204 the engine 20 is constructed with a combustor, such as the combustor 26 described above, that is defined by a combustor liner 36 extending from an upstream end 48 to an exit end 52. Air flow is moved through the combustor liner 36 generally from the upstream end 48 to the exit end 52. At step 206 air is supplied by a compressor, such as the compressor 28, and is admitted into the combustion chamber 40 through the liner 36 via the pilot and main injectors 70, 72, the effusion cooling holes 64 and the quench jets 68. Fuel to the combustion chamber is supplied through the pilot fuel nozzle 74 and the main fuel nozzle 76. A shroud extends into the combustion chamber, and houses the pilot fuel nozzle 74 and the main fuel nozzle 76. At step 208, fuel is injected, such as through the pilot fuel nozzle 74 via a fuel spray, such as in the direction 88 that has the radial direction component 90, the tangential direction component 92 and the forward direction component 94 as described above. At starting of the engine 20, fuel flow is introduced through the pilot injectors 70. The introduced fuel is lit by the igniters 44 causing ignition, and combustion occurs in the pilot zone 96.

At step 210, speed of the engine 20 increases and fuel flow increases to an idle state. During this phase, more than fifty percent of the fuel flow is through the pilot injectors 70, and in an exemplary embodiment, the fuel flow is entirely through the pilot injectors 70. The introduced fuel is completely combusted at stoichiometric conditions producing low levels of CO. When additional power is needed from the engine 20, fuel is injected through the main fuel nozzles 76 at step 212. A fuel spray is directed into the main zone 106 in a direction 100 that has a radial direction component 102 and a rearward direction component 104 as described above. At step 214, more than fifty percent of the fuel flow is delivered through the main fuel nozzles 76 at full power conditions of the engine 20. In an exemplary embodiment, ninety percent of the fuel is supplied through the main fuel nozzles 76 into the main zone 106. The main zone is operated fuel rich and some non-combusted fuel moves to the quench zone 110 at step 216. Moving from the main zone 106 to the quench zone 110, combustion conditions transition from fuel rich to fuel lean rapidly. Air is admitted through the quench jets 68 to make the conversion. Following quench, the combustion products are consumed under fuel-lean conditions, where the combustion process concludes. Combustion is complete at step 218 and the exhaust gases move through the exhaust opening 50 and on the turbine 24. The RQL combustion process results in low NOx and particulate generation. The process 200 may include additional steps including those described above.

Accordingly, exemplary embodiments discussed herein provide improved CO, NOx and particulate emission and temperature characteristics through a pilot and main injector arrangement, axially staged combustion, and by maintaining a desired stoichiometry in an RQL operated combustor 40. Exemplary embodiments may find beneficial use in many applications, including electricity generation, propulsion, fluid transmission, and others.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustion system of a gas turbine engine comprising:
    a combustor liner defining a combustion chamber that extends between an upstream end and an exit end;
    a fuel circuit including a plurality of fuel nozzle sets extending into the combustion chamber, the fuel circuit configured to supply a fuel flow to the combustion chamber, and each fuel nozzle set contained in an injector module that defines a first face and a second face;
    a pilot fuel nozzle opening through the first face of each injector module, wherein each pilot fuel nozzle is configured to inject a first fuel spray in a tangential direction relative to the combustion liner and toward the upstream end of the combustion chamber; and
    a main fuel nozzle opening through the second face of each injector module, wherein each main fuel nozzle is configured to inject a second fuel spray toward the exit end of the combustion chamber;
    wherein, the fuel circuit is configured so that at ignition conditions of the gas turbine engine more than fifty percent of the fuel flow is injected through the pilot fuel nozzles, and at high power conditions of the gas turbine engine more than fifty percent of the fuel flow is injected through the main fuel nozzles;
    wherein the fuel circuit is configured so that the main fuel nozzles supply a fuel rich mixture to the combustion chamber, and a row of quench jets are configured to supply air to the combustion chamber, providing rich-quench-lean combustion in the combustion chamber.

2. The combustion system of claim 1 wherein the injector module comprises a shroud housing each fuel nozzle set so that the pilot fuel nozzle and the main fuel nozzle are housed together.

3. The combustion system of claim 2 wherein the gas turbine engine is configured along a rotational axis, wherein the injector module is disposed with the first face facing in an angular direction relative to the rotational axis resulting in the tangential direction and the second face facing in line with the rotational axis.

4. The combustion system of claim 3 comprising a case that contains the liner and defines an opening, wherein the injector module is disposed in the opening and extends into the combustion chamber through the liner.

5. The combustion system of claim 2 wherein the shroud is domed and defines the first face and the second face, wherein a first number of air jets extends through the first face and surrounds the pilot fuel nozzle and a second number of air jets extends through the second face and surrounds the main fuel nozzle, wherein a plenum is defined between the case and the liner and wherein the shroud includes an open interior which is open to the plenum so that air from the plenum passes through the shroud, the first and second number of air jets and into the combustion chamber.

6. The combustion system of claim 1 wherein the combustion chamber defines a pilot zone supplied with fuel from the pilot fuel nozzles, and a main zone supplied with fuel from the main fuel nozzles.

7. The combustion system of claim 6 comprising a fuel supply system configured to supply substantially all of the fuel supply through the pilot fuel nozzles to the combustion chamber under the ignition conditions and under low load conditions of the gas turbine engine and the fuel supply system configured to supply approximately ninety percent of the fuel supply through the main fuel nozzles to the combustion chamber under the high power conditions of the gas turbine engine.

8. The combustion system of claim 6 wherein the pilot zone is configured to substantially fully combust the fuel flow under low power conditions of the gas turbine engine.

9. The combustion system of claim 1 wherein the combustion chamber contains an axially segregated combustion occurring in a pilot zone, a main zone, and a quench zone.

10. A method of combustion in a gas turbine engine comprising:
    defining a combustion chamber by a combustor liner extending from an upstream end to an exit end;
    flowing air through the combustor liner generally from the upstream end to the exit end;
    flowing fuel to the combustion chamber by a fuel circuit that includes a plurality of fuel nozzle sets extending into the combustion chamber wherein each of the plurality of fuel nozzle sets includes a pilot fuel nozzle and a main fuel nozzle housed together in an injector module, the injector module comprising a shroud that defines a first face and a second face wherein the shroud extends into the combustion chamber;

injecting, through the pilot fuel nozzle defined in the first face, a first fuel spray in a tangential direction relative to the combustor liner and toward the upstream end of the combustion chamber;

injecting, through the main fuel nozzle defined in the second face, a second fuel spray toward the exit end of the combustion chamber;

supplying, by the fuel circuit, more than fifty percent of the fuel flow through the pilot nozzles and the first fuel spray at ignition conditions of the gas turbine engine;

supplying, by the fuel circuit, more than fifty percent of the fuel flow through the main fuel nozzles and the second fuel spray at high power conditions of the gas turbine engine, wherein the main fuel nozzles supply a rich fuel mixture to the combustion chamber; and supplying, through a row of quench jets, air to the combustion chamber providing a rich-quench-lean combustion in the combustion chamber.

11. The method of claim 10 comprising assembling the shroud, the pilot fuel nozzle and the main fuel nozzle in the injector module.

12. The method of claim 11 comprising:
positioning an igniter upstream from the injector module, between the injector module and the upstream end; and
igniting the fuel flow with the igniter.

13. The method of claim 11 comprising:
containing the liner in a case;
defining an opening in the case; and
extending the injector module through the opening, through the liner, and into the combustion chamber.

14. The method of claim 13 comprising:
surrounding the pilot fuel nozzle with a first set of air jets and the main fuel nozzle with a second set of air jets, the first and second sets of air jets defined through the shroud;
defining a plenum between the case and the liner;
forming an open interior in the shroud which is open to the plenum; and
flowing air from the plenum through the shroud, through the air jets, and into the combustion chamber.

15. The method of claim 10 comprising defining in the combustion chamber a pilot zone supplied with fuel from the pilot fuel nozzle, and a main zone supplied with fuel from the main fuel nozzle.

16. The method of claim 15 comprising supplying approximately ninety percent of the fuel supply to the combustion chamber through the main fuel nozzle under the full power conditions of the gas turbine engine.

17. The method of claim 15 comprising substantially fully combusting the fuel flow in the pilot zone under low power conditions of the gas turbine engine.

18. The method of claim 15 comprising:
operating the pilot zone at an equivalence ratio of approximately 0.4 at full power conditions of the gas turbine; and
operating the main zone at an equivalence ratio of approximately 2.0 at full power conditions of the gas turbine.

19. The method of claim 15 comprising operating the main zone fuel rich with a low residence time at full power conditions of the gas turbine engine.

20. A combustion system of a gas turbine engine rotating about an axis, the combustion system comprising:
a combustor liner defining a combustion chamber extending from an upstream end to an exit end and configured for air to flow through the combustor liner from the upstream end to the exit end, with an axial direction defined from the upstream end to the exit end, the combustor liner encircling the combustion chamber;
a fuel circuit including a plurality of injector modules, each injector module including a first face and a second face and extending into the combustion chamber, the fuel circuit configured to supply a fuel flow to the combustion chamber;
a pilot fuel nozzle in the first face of each injector module, wherein the first face faces in an angular direction relative to the axis so that each pilot fuel nozzle is configured to inject a first fuel spray in a tangential direction relative to the combustion liner and toward the upstream end of the combustion chamber; and
a main fuel nozzle in the second face of each injector module, wherein the second face faces along the axis so that each main fuel nozzle is configured to inject a second fuel spray toward the exit end of the combustion chamber;
wherein, the fuel circuit is configured so that at ignition conditions of the gas turbine engine more than fifty percent of the fuel flow is injected through the pilot fuel nozzles, and at high power conditions of the gas turbine engine more than fifty percent of the fuel flow is injected through the main fuel nozzles;
wherein the fuel circuit is configured so that the main fuel nozzles supply a fuel rich mixture to the combustion chamber, and a row of quench jets are configured to supply air to the combustion chamber, at a location downstream from the main fuel nozzles in the axial direction, providing rich-quench-lean combustion in the combustion chamber.

* * * * *